United States Patent [19]
Dow et al.

[11] Patent Number: 6,043,503
[45] Date of Patent: Mar. 28, 2000

[54] HAND HELD SCANNING DEVICE

[75] Inventors: James C. Dow; Thomas E. Berg; David J. Sims, all of Fort Collins, Colo.; Scott Henderson, Brooklyn, N.Y.; Davin Stowell; Steven Vordenberg, both of New York, N.Y.; Daniel Formosa, Montvale, N.J.

[73] Assignee: Hewlett-Packard Company, Palo Alto, Calif.

[21] Appl. No.: 09/120,641

[22] Filed: Jul. 22, 1998

[51] Int. Cl.[7] ...................................................... G06K 7/10
[52] U.S. Cl. ...................... 250/566; 250/234; 250/208.1; 235/472.01
[58] Field of Search .................................... 250/235, 234, 250/557, 221, 566, 208.1; 358/473, 488; 382/311–316; 235/472.01, 472.02, 462.45

[56] References Cited

U.S. PATENT DOCUMENTS

| | | | |
|---|---|---|---|
| 5,410,141 | 4/1995 | Koenck et al. | 235/472.02 |
| 5,578,813 | 11/1996 | Allen et al. | 250/208.1 |
| 5,644,139 | 7/1997 | Allen et al. | 250/557 |

OTHER PUBLICATIONS

Design Patent Application Serial No. 29/090,629, filed Jul. 13, 1998 for "Hand Held Optical Scanner" of James C. Dow et al.
Patent Application Serial No. 09/120,637, filed Jul. 22, 1998 for "Hand Held Scanning Device" of James C. Dow et al.
Design Patent Application Serial No. 29/090,598, filed Jul. 13, 1998 for "Hand Held Optical Scanner Front Face Portion" of James C. Dow et al.
Design Patent Application Serial No. 29/090,600, filed Jul. 13, 1998 for "Hand Held Optical Scanner Rear Face Portion" of James C. Dow et al.
Design Patent Application Serial No. 29/090,614, filed Jul. 13, 1998 for "Battery Cover for Hand Held Apparatus Such as an Optical Scanner" of James C. Dow et al.

*Primary Examiner*—Que T. Le

[57] ABSTRACT

A hand held electronic scanning device that preferably has a front surface provided with abutments so that, when the front surface is laid on a supporting surface, operating buttons on the front surface will not contact the supporting surface and a transparent member covering a display window opening will also not contact the support surface to avoid scuffing thereof.

7 Claims, 4 Drawing Sheets

HAND HELD SCANNING DEVICE

TECHNICAL FIELD

The present invention relates generally to hand held capture and communicate devices also referred to as scanning devices for forming scanned electronic images of originals and more particularly to hand held scanning devices that are protected against accidental operation of its control buttons.

BACKGROUND ART

In the U.S. Pat. Nos. 5,578,813 and 5,644,139, which are incorporated herein by reference thereto, there is disclosed apparatus and method for forming a scanned electronic image which includes an imaging sensor and at least one navigation sensor. A hand held scanning device is moved over the object to be "scanned" or "captured". The hand held scanning devices disclosed in the above-identified patents are of a rectangular configuration having relatively planar surfaces. While not illustrated in these patents, the hand held scanning devices are provided with control buttons that are on either side of the image display portion thereof. It is desirable that these control buttons be not exposed to any accidental operation.

SUMMARY OF THE INVENTION

This invention provides a hand held scanning device that is preferably provided with protective structures to prevent the accidental operation of control buttons if the hand held scanning device is placed on a supporting surface.

In a preferred embodiment of the invention, the hand held scanning device has a housing for holding the various components for its desired method of operation as described in the above-identified patents. The housing has a front portion having a front surface. A plurality of control buttons are mounted in the front portion and extend through openings in the front surface for contact by the operator of the hand held scanning device. The front portion is provided with at least one abutment surface that projects outwardly therefrom and cooperates with at least another portion of the hand held scanning device in holding the control buttons in a spaced apart relationship with a supporting surface when the hand held scanning device is not in use. The abutment is preferably associated with a transparent member that covers an image display window opening in the front surface. The transparent member is provided with an integral outwardly projecting portion that has an arcuate configuration and projects outwardly a sufficient distance to form the abutment that maintains the control buttons in the desired spaced apart relationship with the supporting surface when not in use. The abutment also prevents the associated transparent member from being "scuffed" by coming into contact with the support surface.

Mode for Carrying Out the Invention

Figure 1:
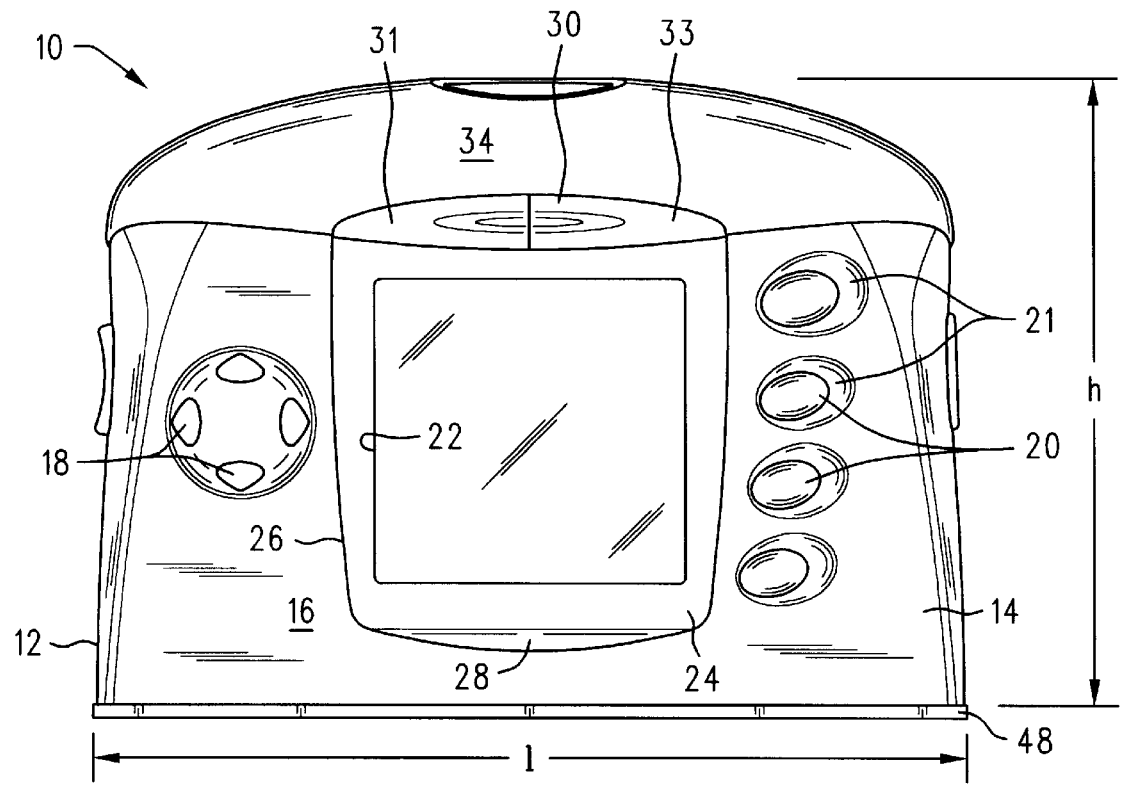
FIG. 1 is a front elevational view of a hand held scanning device of this invention.
Figure 5:
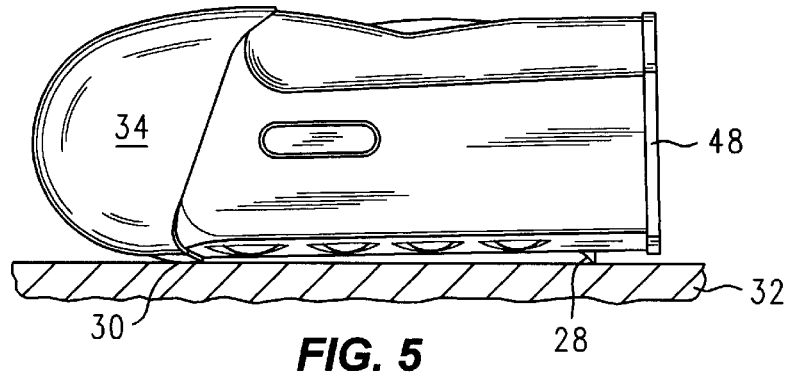
FIG. 5 is a side elevational view of the right side of FIG. 1 on a support surface.
Figure 6:
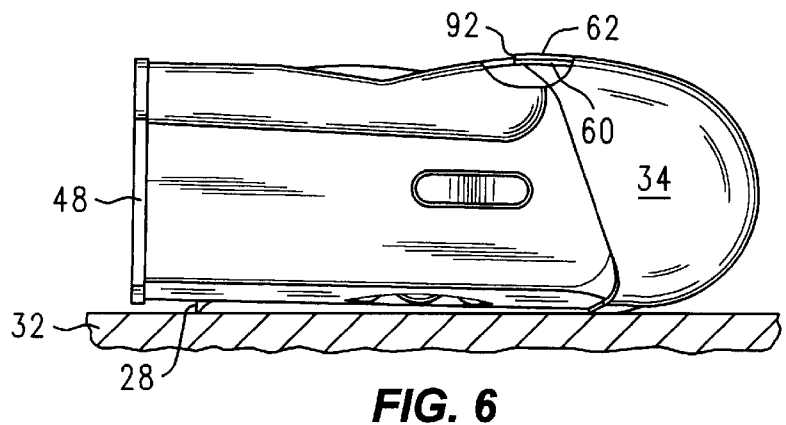
FIG. 6 is a side elevational view of the left side of FIG. 1 on a support surface.
Figure 12:
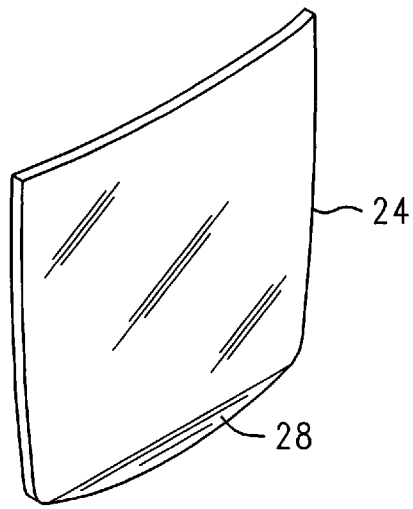
FIG. 12 is a perspective view of a transparent member.

In FIG. 1, there is illustrated a hand held scanning device 10. The hand held scanning device 10 has a housing 12 for holding the components of the hand held scanning device which may be the same as those described in the above-identified patents. The housing 12 has a front portion 14, having a front surface 16. A plurality of control buttons 18 and 20 are mounted in the front portion 14 and are exposed through openings in the front surface 16. In one embodiment the buttons 18, 20 are provided in corresponding recesses 19, 21 which may be as deep or nearly as deep as the height of the buttons to help prevent accidental actuation of the buttons 18, 20. An image display window opening 22 is formed in the front portion 14 and is covered by a transparent member 24 which is seated in a recess 26 in the front portion 14 surrounding the image display window opening 22. The thickness of the transparent member 24, except at portion 28, is the same as the depth of the recess 26. Transparent member 24 may be formed from polycarbonate such as Lexan® available from GE or other suitable transparent material. Transparent member 24 is shown in FIG. 12. An arcuately shaped portion 28 which may be duck tail shaped, is provided which may be separately formed or may be integral with the transparent member 24 and projects outwardly from the front surface 16. In one embodiment it projects outwardly about 2.0 mm. As illustrated in FIGS. 5 and 6, the portion 28 cooperates with another spaced apart portion 30, as described further below, to hold the control buttons 18 and 20 and the portion of the transparent member 24 which covers display window opening 22 in a spaced apart relationship with a support surface 32 when the hand held scanning device 10 is placed, front face down, on the support surface 32. A cover 34, explained more fully below, is connected to the hand held scanning device 10. The portion 28 also provides tactile feedback to the user suggesting where the user's thumb or finger tips should be positioned to grip the device 10 during scanning.

Figure 2:
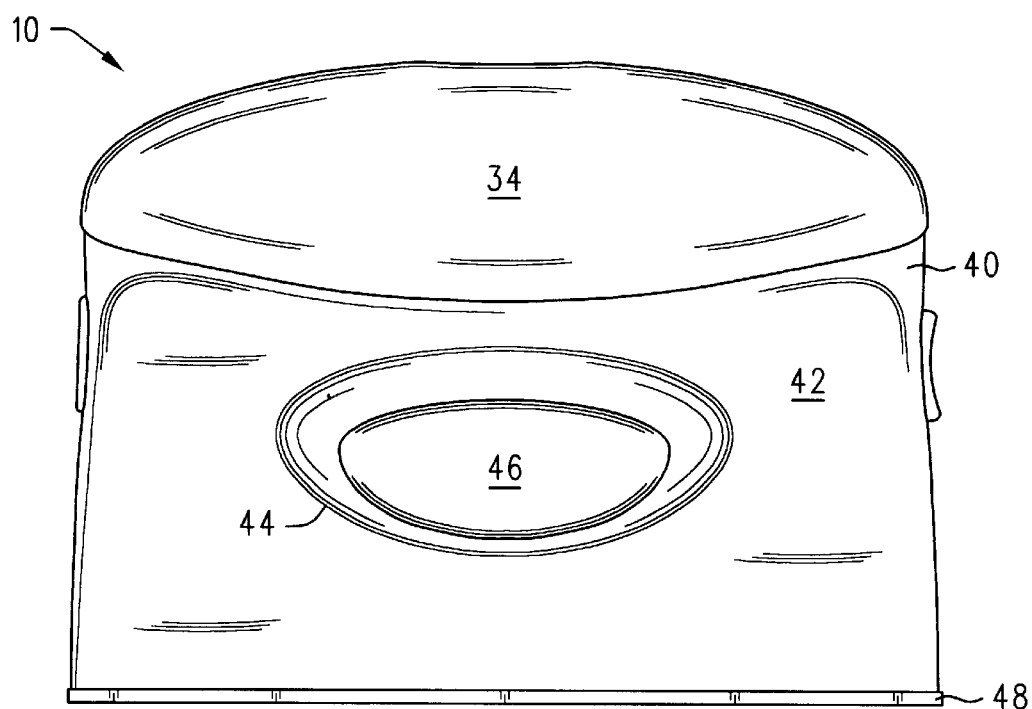
FIG. 2 is a back elevational view of FIG. 1.

In FIG. 2, there is illustrated the back of the hand held scanning device 10 comprising a back portion 40 having a back surface 42. A recess 44 is formed in the back portion 40 and a control button 46 is mounted on the back portion 40 so that the control button projects through an opening in the back surface 42. The front portion 14 and the back portion 40 are supported on a base 48 and held together by conventional structures such as screws threaded into bosses (not shown).

Figure 3:
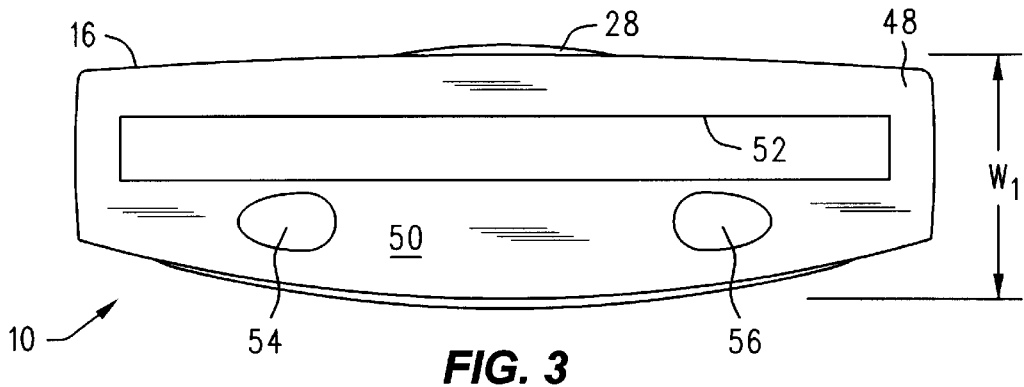
FIG. 3 is a bottom plan view of FIG. 1.
Figure 4:
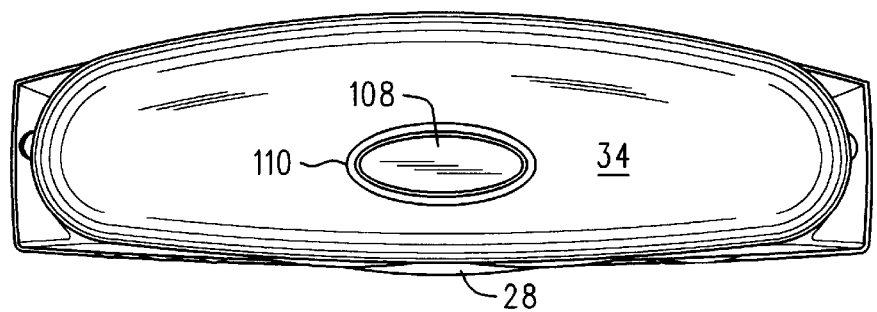
FIG. 4 is a top plan view of FIG. 1.

In FIG. 3, there is illustrated the bottom of the hand held scanning device 10 comprising a bottom surface 50 of base 48. An opening 52 is formed in the bottom surface 50 and extends through base 48 so that imaging sensors (not shown) in the hand held scanning device 10 may be exposed to the object being scanned. Other openings 54 and 56 are formed in the bottom surface 50 so that navigation sensors in the hand held scanning device 10 may be exposed to the object being scanned.

In one preferred embodiment the height "h" of the device 10 may be about 104 mm; the length "I" may be about 139 mm; the width "$W_1$", at the base may be about 38 mm; and the width "$W_2$" at the top cover 34 may be about 39 mm.

Figure 8:
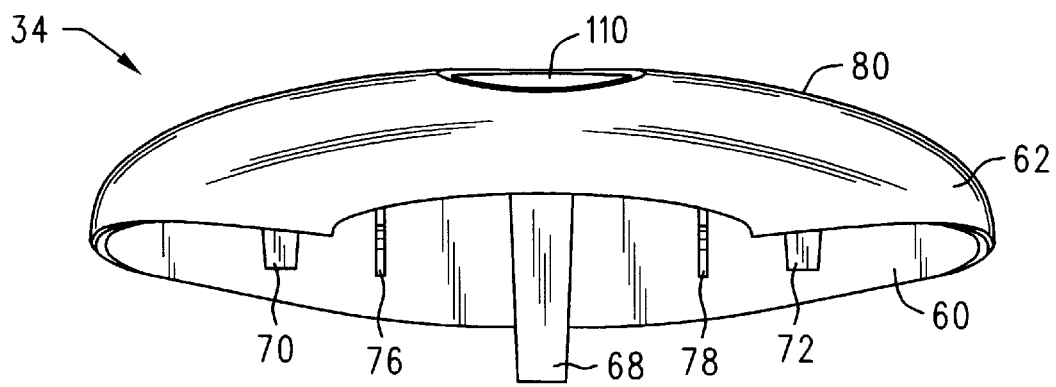
FIG. 8 is a front elevational view of the cover of this invention.
Figure 9:
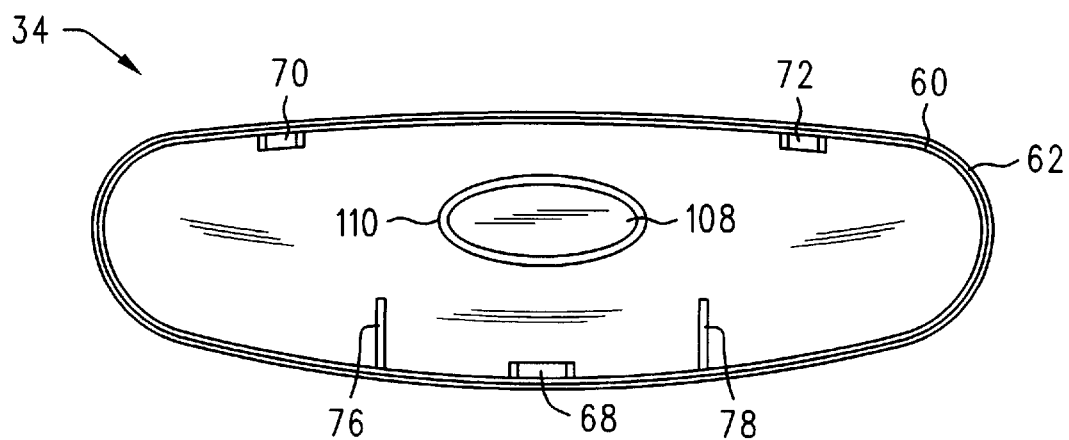
FIG. 9 is a bottom plan view of FIG. 8.
Figure 10:
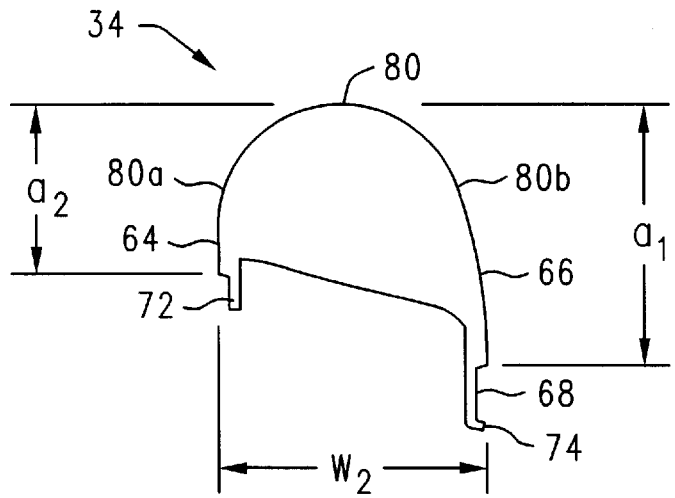
FIG. 10 is a side elevational view of the right side of FIG. 8.

The cover 34 is illustrated in FIGS. 8–10 and comprises an inner layer 60 and an outer layer 62.

As illustrated in FIG. 9, the exposed bottom edge of the inner layer 60 forms an opening in the inner layer and has a configuration that is generally curvilinear in shape. The outer layer 62 conforms to the shape of the inner layer 60 but is slightly larger. The shape of the opening formed by the inner layer 60 is somewhat governed by the components mounted in the hand held scanning device 10. However, the generally curvilinear shape illustrated in FIG. 9 is preferred. Layer 60 maybe about 1.3 mm thick and layer 62 may be about 1.2 mm thick.

As illustrated in FIG. 10, the cover 34 has a front portion 64 and a back portion 66 with the back portion 66 extending downwardly a distance greater than the front portion 64. A prong 68 extends downwardly from the back portion 66 and two prongs 70 and 72 extend downwardly from the front portion 64. The prongs 68, 70 and 72 can be integral with the inner layer 60 or can be separate elements secured to the inner layer 60. The prong 68 has a hook portion 74 for a purpose described below. Two reinforcing ribs 76 and 78 are secured to the inner layer 60 or may be integral therewith. In a preferred embodiment of the invention, the inner layer 60 is formed from a relatively hard plastic material such as polycarbonate and the outer layer is formed from a relatively soft plastic material such as Santoprene®. Also, the outer layer is preferably molded over the inner layer. However, the outer layer may be secured to the outer layer in other ways, such as by an adhesive.

The shape of the outer surface of the cover 34 is designed to be compatible with the hand of the user of the hand held scanning device 10 in a variety of different positions between the hand of the user and the hand held scanning device 10. The shape of the outer surface has no sharp corners or edges that would result in a discomfort to the user or require the positioning of the hand of the user at awkward positions. The shape of the outer surface also is symmetrical so that the hand held scanning device can be used by a right handed or left handed user.

Figure 11:
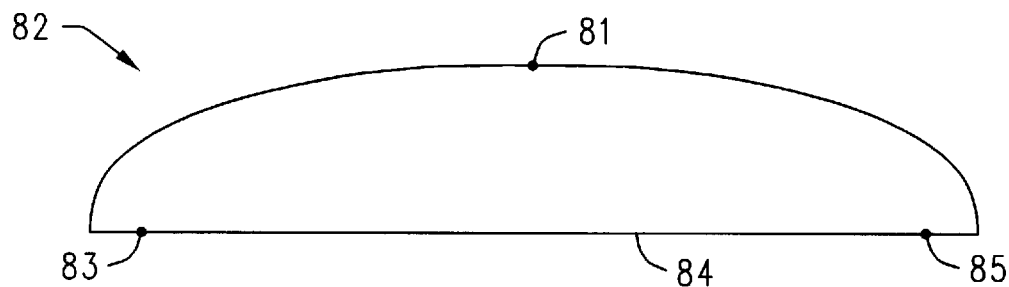
FIG. 11 is a semi-ellipse.

In a preferred embodiment of the invention, the top portion 80 of the outer surface of the cover 34 between the points 80 a and b is generally a semi-ellipsoidal surface and is formed by rotating the semi-ellipse 82 of FIG. 11 about its axis 84 through 180 degrees. The semi-ellipse 82 has an axial length of about 131 mm, and apex 81 of about 19 mm from axis 84 and focal points 83, 85 spaced 9 mm from each axial end. The length of axis 84 may be about 131 mm. Although the outer surface of the top portion 80 in the illustrated embodiment does not conform exactly to the semi-ellipsoid formed by rotating the ellipse 82, the outer surface closely approaches it. The portions of the cover 34 below the top portion 80 expand slightly in a curvilinear path. The rear height "$a_1$" of the cover may be about 38 mm and the front height "$a_2$" may be about 19 mm. The compliant nature of the relatively soft plastic material of the outer layer 62 provides a tactile feedback to the user saying "hold here". Also, the relatively soft plastic outer layer 62 provides a non-slip gripping surface.

Figure 7:
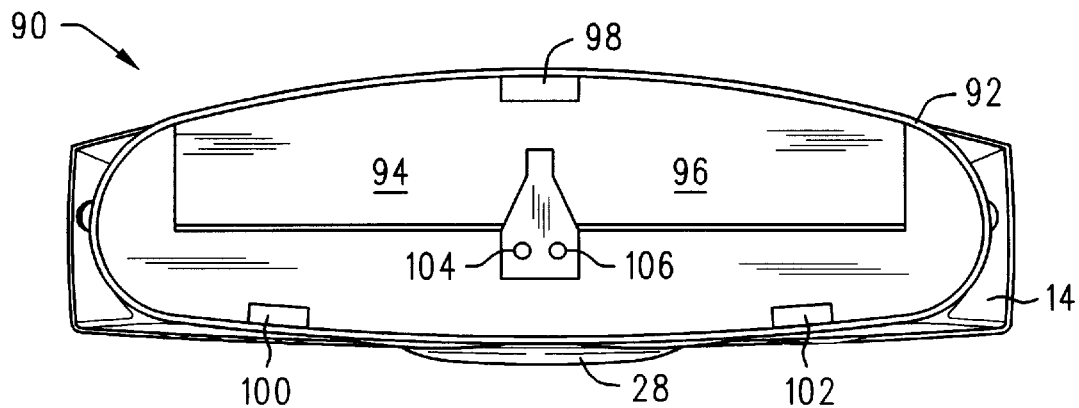
FIG. 7 is a top plan view of FIG. 1 with the cover removed.

In FIG. 7, there is illustrated the top portion 90 of the hand held scanning device 10. The top portion 90 may have an abutment ledge 92 for purposes described below. Two receptacles 94 and 96 are provided in the top portion 90 for the placement of a battery (not shown) in each receptacle. An opening 98 is formed in the top portion 90 so that the prong 68 may pass therethrough. Openings 100 and 102 are formed in the top portion 90 so that prongs 70 and 72 may pass therethrough. Openings 104 and 106 are also formed in the top portion 90 so that infra-red rays from the components located within the hand held scanning device may pass therethrough. The cover 34 is provided with an opening 108 which is closed by an closure 110 that is formed from a material which permits the passage of the infra-red rays. Closure 110 may be integrally formed with inner layer 60 and project through an opening in the outer layer 62 or, in the alternative, may be an insert that covers an opening passing through both layers 60 and 62.

After batteries have been placed in the receptacles 94 and 96, the cover 34 is attached by placing the prongs 70 and 72 in the openings 100 and 102 and the prong 68 in the opening 98. A force is applied to the cover 34 to move the cover 34 downwardly until the exposed edge of the inner layer 60 contacts the abutment ledge 92. At this time, the hook portion 74 engages the inner edge of the opening 98 to lock the cover 34 in place. The cover 34 may be removed by pressing inwardly against the cover 34 at the location adjacent to the prong 68 and exerting an outwardly directed force on the cover 34. The relative positions of the abutment ledge 92, the inner layer 60 and the outer layer 62 are illustrated in FIG. 6. Portion 30 is actually two "eye brow" buttons 31, 33 which invoke/generate a "help" screen menu and a "tools" screen menu, respectively when pressed. Since the help menu or the tools menu are just display screens it doesn't hurt anything to accidentally push these buttons, i.e., no new scanned data will be generated and no stored scanned data will be lost if these buttons are pressed, thus, they are ok to use as an abutment/spacer. However, this same spacer abutment function could be provided by a lip, etc., formed on the housing or the cover. In one embodiment (not shown), the exposed edge of the inner layer 60 abuts against the abutment edge 92 so that the outer layer 62 projects outwardly from the front surface 16 of the front portion 14 to provide the portion 30 to cooperate with the portion 28 in holding the control buttons 18 and 20 spaced from the supporting surface 32.

In use, the hand held scanning device 10 is grasped by the hand of the user and in particular the hand of the user contacts the outer layer 62 of the cover 34. As described above, the inner surface of the palm, fingers and thumb of the operator may be defined as having a longitudinal axis extending in a direction generally parallel to the fingers. The cover also has a longitudinal axis. The cover is compatible with the inner surface of the palm, fingers and thumb of the operator so that the hand held scanning device may be comfortably held by the operator with both of the longitudinal axes extending in the same direction or with the longitudinal axis of the cover extending in a direction transverse to the longitudinal axis of the inner surface of the palm, fingers and thumb or at various angular relationships therebetween. This permits the user to grasp the hand held scanning device in a plurality of ways so as to avoid fatigue and improve capturing performance.

It is contemplated that the inventive concepts herein described may be variously otherwise embodied and it is intended that the appended claims be construed to include alternative embodiments of the invention except insofar as limited by the prior art.

What is claimed:

1. A hand held scanning device comprising:
   a housing for holding the components of an electronic scanning device;
   said housing having a front portion and a back portion secured together;

said front portion having a front surface having an image display window opening formed therein;

a transparent member mounted on said front portion and covering said image display window opening;

said front surface having a plurality of spaced apart openings formed therein;

a plurality of control buttons having portions thereof projecting through said plurality of spaced apart openings for contact by an operator of said hand held scanning device;

said housing having a bottom surface;

said bottom surface having at least one opening formed therein so that imaging sensors in said hand held scanning device may be exposed to the object being scanned;

said housing having a top portion;

at least one battery holding receptacle formed in said top portion; and a cover for said battery holding receptacle removably secured to said top portion.

2. A hand held scanning device comprising:

a housing for holding the components of an electronic scanning device;

said housing having at least a front portion;

said front portion having a front surface;

a plurality of control buttons mounted in said front portion for contact by an operator of said scanning device; and at least one abutment projecting outwardly from said front surface to cooperate with at least another portion of said hand held scanning device in holding said control buttons in a spaced apart relationship with a supporting surface when said scanning device is not in use.

3. A hand held scanning device as in claim 2 and further comprising:

said front surface having an image display window opening formed therein;

a transparent member covering said image display window opening; and said transparent member providing said at least one abutment.

4. A hand held scanning device as in claim 3 and further comprising:

said hand held scanning device having a top surface and a bottom surface;

said bottom surface located to be placed in contact with the image to be scanned; and said at least one abutment being located closer to said bottom surface than to said top surface.

5. A hand held scanning device as in claim 4 wherein:

said at least one abutment comprises an outwardly projecting portion of said transparent member.

6. A hand held scanning device as in claim 5 wherein:

said outwardly projecting portion is arcuate.

7. A hand held scanning device as in claim 3 wherein:

said at least one abutment holding said transparent member in a spaced apart relationship with said supporting surface to prevent scuffing of said transparent member.

* * * * *